US009615566B2

(12) United States Patent
Bond et al.

(10) Patent No.: US 9,615,566 B2
(45) Date of Patent: Apr. 11, 2017

(54) ANIMAL TRAPS AND TRIGGER MECHANISMS

(71) Applicant: Goodnature Limited, Wellington (NZ)

(72) Inventors: Craig Richard Bond, Wellington (NZ); Stuart William Barr, Wellington (NZ); Robert Blair van Dam, Wellington (NZ)

(73) Assignee: Goodnature Limited, Wellington (NZ)

( * ) Notice: Subject to any disclaimer, the term of this patent is extended or adjusted under 35 U.S.C. 154(b) by 379 days.

(21) Appl. No.: 14/010,345

(22) Filed: Aug. 26, 2013

(65) Prior Publication Data

US 2014/0059917 A1    Mar. 6, 2014

Related U.S. Application Data

(60) Provisional application No. 61/695,224, filed on Aug. 30, 2012.

(51) Int. Cl.
*A01M 27/00* (2006.01)
*A01M 23/14* (2006.01)
*A01M 23/36* (2006.01)

(52) U.S. Cl.
CPC ........... *A01M 27/00* (2013.01); *A01M 23/14* (2013.01); *A01M 23/36* (2013.01)

(58) Field of Classification Search
CPC ...... A01M 23/00; A01M 27/00; A01M 23/36; A01M 23/14

(Continued)

(56) References Cited

U.S. PATENT DOCUMENTS 3,527,142 A * 9/1970 Obergfell ............... B25C 1/041
227/130
4,513,527 A * 4/1985 Wicklund ............ A01M 23/34
124/31

(Continued)

FOREIGN PATENT DOCUMENTS

CA    1289109    9/1991
DE    4441928    5/1996

(Continued)

OTHER PUBLICATIONS

Bond et al., WO 2010/101481.*

(Continued)

*Primary Examiner* — Thien Thanh Pham
(74) *Attorney, Agent, or Firm* — Thomas Coester Intellectual Property

(57) ABSTRACT

An animal trap may include a source of compressed gas; a trigger mechanism configured to be actuated by an animal, and a kill mechanism powered by compressed gas. The trap may include two or more trigger valves connected in series. At least one trigger valve may include an opening, a valve seat surrounding the opening, a valve member having a sealing surface, and an O-ring arranged to seal between the sealing surface and the valve seat. One or more flow paths may allow gas to flow along at least part of an internal periphery of the O-ring. The trigger may include a trigger rod extending in a rest position from a mount at or near a first end thereof. The trigger rod may be mounted for pivoting movement about the mount, and may have two rotational degrees of freedom. Pivoting movement of the trigger rod in any direction away from the rest position may result in actuation of the trigger.

17 Claims, 9 Drawing Sheets

(58) Field of Classification Search
USPC .................................. 43/58–99; 251/33–46
See application file for complete search history.

(56) References Cited

U.S. PATENT DOCUMENTS

| | | | |
|---|---|---|---|
| 4,567,688 A | | 2/1986 | McKee |
| 5,548,922 A | | 8/1996 | Wefler |
| 5,652,970 A | * | 8/1997 | Wodeslavsky .......... E03D 1/302 137/391 |
| 6,553,712 B1 | | 4/2003 | Majerowski et al. |
| 7,331,108 B2 | * | 2/2008 | Rondinone ............. A22B 3/10 30/123.3 |
| 7,360,671 B2 | | 4/2008 | Slade |
| 7,647,938 B2 | * | 1/2010 | Jobe ........................ E03D 1/32 137/15.26 |
| 2007/0266618 A1 | * | 11/2007 | Sturgeon ............... A01M 23/34 43/73 |
| 2011/0296739 A1 | | 12/2011 | Bond et al. |

FOREIGN PATENT DOCUMENTS

| | | |
|---|---|---|
| NZ | 233907 | 6/1990 |
| NZ | 240098 | 10/1991 |
| NZ | 512101 | 6/2004 |
| NZ | 531052 | 9/2004 |
| WO | WO-0258461 | 5/2002 |
| WO | WO-2006044171 | 4/2006 |

OTHER PUBLICATIONS

McDonald, et al., "New Technology for Poison Delivery", *NZ Journal of Ecology*— 1992 23(2): 289-292, (1999).

O'Conor, et al., "Palatability of rodent baits to wild house mice", *Science for Conservation 184, Department of Conservation,* Sep. 2001, (Sep. 2001).

Thomas, et al., "A rat-resistant bait for kill traps", Project No. R80617—*Prepared for Animal Health Board,* Jun. 2004, (Jun. 2004).

* cited by examiner

ANIMAL TRAPS AND TRIGGER MECHANISMS

FIELD OF THE INVENTION

The invention relates to animal traps, particularly but not exclusively to animal kill traps.

BACKGROUND TO THE INVENTION

Known animal traps generally include some form of trigger with a mechanical kill mechanism powered by a spring. Traps are used to kill various pests, including (in New Zealand) mice, rats, stoats, possums, hedgehogs, cats, weasels and ferrets. In other countries, other pests are of course present.

Known traps generally include three types of trap. Cage traps capture animals alive and allow non target species to be released. Target species are killed by the trapper, which has the advantage that the animal's fur can be more easily removed while the animal is still warm. Leg hold and snare traps physically hold an animal by securely holding its leg. These traps also capture the animal alive and are much lighter and more compact than cage traps.

The third type of trap is the kill trap, which automatically kills animals rather than capturing them alive. These traps generally kill and retain an animal, and therefore require a user to empty and reset the trap. Some users find emptying a trap disagreeable and in some circumstances it may not be practical or may reduce the efficiency of a pest control programme. For example, stoat traps are widely distributed through New Zealand forests. These traps are emptied periodically—approximately every four weeks. The traps are also re-baited at this time. This requires significant labour, since rangers are required to walk the trap line clearing, re-setting and re-baiting the traps. In addition, if a trap is triggered soon after being checked it will be out of action for most of the four week period.

The Applicant has proposed various improvements to animal kill traps in its PCT applications PCT/NZ2010/000037 and PCT/NZ2011/000178, the entire contents of which are hereby incorporated by reference herein. The Applicant has found that further improvements are possible.

McKee (U.S. Pat. No. 4,567,688) discloses an animal cage trap actuated by a pneumatic mechanism. That mechanism is unlikely to work well as it would require a significant force in order to be actuated and the time between movement of the trigger and actuation of the cage closing mechanism would be relatively long. While this mechanism may be suitable for cage trap applications for relatively large pests, it is not well suited to kill-trap applications or to smaller or more cautious animals.

Reference to any prior art in this specification does not constitute an admission that such prior art forms part of the common general knowledge.

It is an object of the invention to provide an improved trigger arrangement and/or an improved trap, or at least to provide the public with a useful choice.

SUMMARY OF THE INVENTION

In a first aspect the invention provides a pneumatically powered animal trap including: a source of compressed gas; a trigger mechanism configured to be actuated by an animal, the trigger mechanism including: two or more trigger valves connected in series, the two or more trigger valves including a first trigger valve and a last trigger valve; one or more trigger valve spaces, each trigger valve space being positioned between a pair of trigger valves; and a trigger configured to open the first trigger valve when actuated by an animal; a main valve; a main valve space between the last trigger valve and the main valve; and a kill mechanism powered by compressed gas; wherein: in a ready state each trigger valve space and the main valve space are pressurized by compressed gas; opening of each trigger valve vents a trigger valve space, which in turn causes a further trigger valve to open until all trigger valves have been opened; and opening of the last trigger valve vents the main valve space, which causes actuation of the main valve to allow compressed gas to flow to the kill mechanism.

Preferably the first trigger valve is configured to vent a first trigger valve space having a volume less than 2 $cm^3$. Preferably the first trigger valve space has a volume less than 1 $cm^3$. Preferably the first trigger valve space has a volume between 0.1 and 0.5 $cm^3$. Preferably the first trigger valve space has a volume around 0.25 $cm^3$.

Preferably the first trigger valve includes: an opening; a valve seat surrounding the opening; a valve member having a sealing surface; an O-ring arranged to seal between the sealing surface and the valve seat; and an O-ring retainer configured to retain the O-ring on either the valve member or the valve seat.

Preferably the first trigger valve further includes one or more flow paths allowing gas flow along at least part of an internal periphery of the O-ring. Preferably the flow path includes one or more channels, conduits, recesses, grooves, apertures or flutes along or communicating with the internal periphery of the O-ring.

Preferably the trap includes a bait or bait mount separate from the trigger.

Preferably the last trigger valve includes: a diaphragm sealing an exit from the main valve space, wherein venting of a last trigger valve space releases pressure on one side of the diaphragm, thereby allowing the diaphragm to move to open the exit, thereby venting the main valve space.

Preferably the trap includes two trigger valves and a single trigger valve space between the two trigger valves.

Preferably the trigger is a trigger rod extending in a rest position from a mount at or near a first end thereof, the trigger rod being mounted for pivoting movement about the mount with two rotational degrees of freedom, and arranged such that pivoting movement of the trigger rod in any direction away from the rest position results in actuation of the trigger.

Preferably the trap has a trigger threshold distinct from the rest position, such that the trigger rod may be moved from the rest position up to the trigger threshold without actuation of the trigger, but further movement of the trigger rod past the trigger threshold results in actuation of the trigger.

Preferably the trap includes: an entrance; and a bait; wherein the trigger is a trigger rod extending in a rest position from a mount at or near a first end thereof into a space between the entrance and the bait, the trigger rod being mounted for pivoting movement about the mount and the kill mechanism is configured to operate between the entrance and the trigger rod.

In a second aspect the invention provides a pneumatically powered animal trap including: a source of compressed gas; a trigger mechanism configured to be actuated by an animal, the trigger mechanism including: a trigger valve including: an opening; a valve seat surrounding the opening; a valve member having a sealing surface; an O-ring arranged to seal between the sealing surface and the valve seat; and an O-ring retainer configured to retain the O-ring on either the valve member or the valve seat; one or more flow paths along at least part of an internal periphery of the O-ring; and a trigger configured to open the trigger valve when actuated by an animal, the trigger operating to pivot the valve member so as to break the seal between the sealing surface and the valve seat; a main valve; and a kill mechanism powered by compressed gas; wherein opening of the trigger valve results in actuation of the main valve to allow compressed gas to flow to the kill mechanism.

Preferably the one or more flow paths include one or more channels, conduits, recesses, grooves, apertures or flutes along or communicating with the internal periphery of the O-ring. Preferably the one or more flow paths are formed on the O-ring retainer.

Preferably the O-ring has a Shore A hardness of 55 to 70.

Preferably the O-ring is formed from nitrile or silicone rubber. Preferably the O-ring is formed from silicone rubber.

Preferably the O-ring is a dynamic O-ring that deforms and/or moves under pressure when the trigger valve is opened.

Preferably the O-ring has an internal diameter less than 10 mm. Preferably the O-ring has an internal diameter between 2 and 5 mm. Preferably the O-ring has an internal diameter of around 3 mm Preferably the O-ring has a radial cross-section that is less than 3 mm in width. Preferably the O-ring has a radial cross-section that is between 0.5 and 2 mm in width. Preferably the O-ring has a radial cross-section that around 1 mm in width.

Preferably the O-ring retainer is on the valve member.

In third aspect the invention provides an animal trap including a trigger rod extending in a rest position from a mount at or near a first end thereof, the trigger rod being mounted for pivoting movement about the mount with two rotational degrees of freedom, and arranged such that pivoting movement of the trigger rod in any direction away from the rest position results in actuation of the trigger.

Preferably the trap has a trigger threshold distinct from the rest position, such that the trigger rod may be moved from the rest position up to the trigger threshold without actuation of the trigger, but further movement of the trigger rod past the trigger threshold results in actuation of the trigger.

Preferably the trigger rod has a rod diameter less than 5 mm. Preferably the rod diameter is less than 3 mm. Preferably the rod diameter is between 1 and 2 mm.

Preferably the trigger rod extends between 30 and 70 mm from the mount. Preferably the trigger rod extends between 40 and 60 mm from the mount.

Preferably a restoring force tends to maintain the trigger rod in the rest position. Preferably the restoring force is around 1.5 Newtons.

Preferably the trap includes a biasing element applying the restoring force. Preferably the biasing element is a spring.

Preferably the trigger rod has a mass less than 5 grams. Preferably the trigger rod has a mass between 0.5 and 1 gram. Preferably the trigger rod has a mass around 0.6 grams.

In a fourth aspect the invention provides an animal trap including: an entrance; a bait; a trigger rod extending in a rest position from a mount at or near a first end thereof into a space between the entrance and the bait, the trigger rod being mounted for pivoting movement about the mount; a kill mechanism configured to operate between the entrance and the trigger rod; wherein movement of the trigger rod from the rest position by an animal causes actuation of the kill mechanism to kill the animal.

Preferably the entrance is dimensioned for a target animal.

Preferably the space in which the trigger rod extends is dimensioned such that an adult target animal cannot move past the rod without moving the trigger rod from the rest position.

Preferably the bait is an attractant for a target animal.

Preferably the trigger rod has two rotational degrees of freedom, and is arranged such that pivoting movement of the trigger rod in any direction away from the rest position results in actuation of the trigger.

Preferably the trap has a trigger threshold distinct from the rest position, such that the trigger rod may be moved from the rest position up to the trigger threshold without actuation of the trigger, but further movement of the trigger rod past the trigger threshold results in actuation of the trigger.

Preferably the trigger rod has a rod diameter less than 5 mm. Preferably the rod diameter is less than 3 mm. Preferably the rod diameter is between 1 and 2 mm.

Preferably the trigger rod extends between 30 and 70 mm from the mount. Preferably the trigger rod extends between 40 and 60 mm from the mount.

Preferably a restoring force tends to maintain the trigger rod in the rest position. Preferably the restoring force is around 1.5 Newtons.

Preferably the trigger rod has a mass less than 5 grams. Preferably the trigger rod has a mass between 0.5 and 1 gram.

BRIEF DESCRIPTION OF THE DRAWINGS

The invention will now be described by way of example only, with reference to the accompanying drawings, in which.

DETAILED DESCRIPTION

Figure 1:
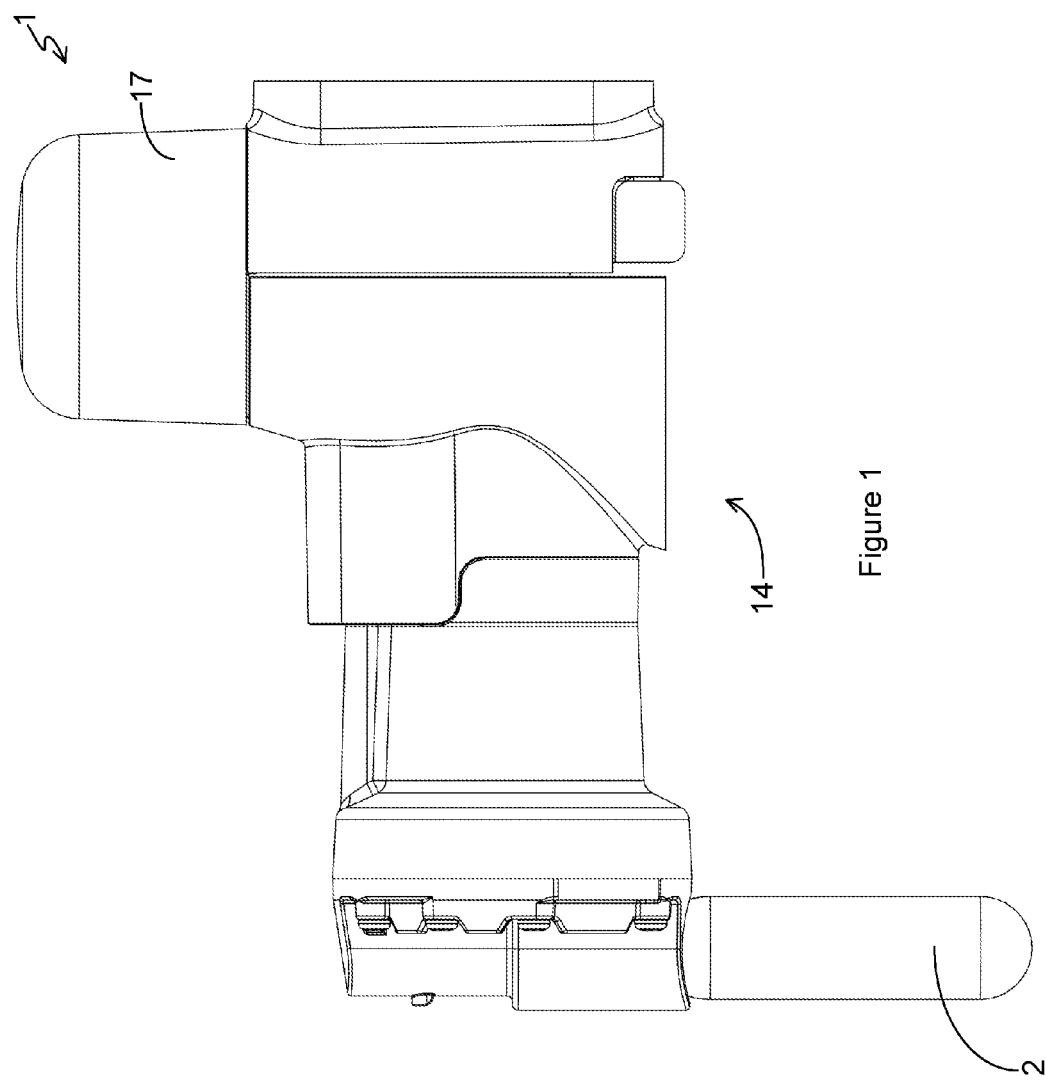
FIG. 1 is a side view of a trap according to one embodiment.
Figure 2:
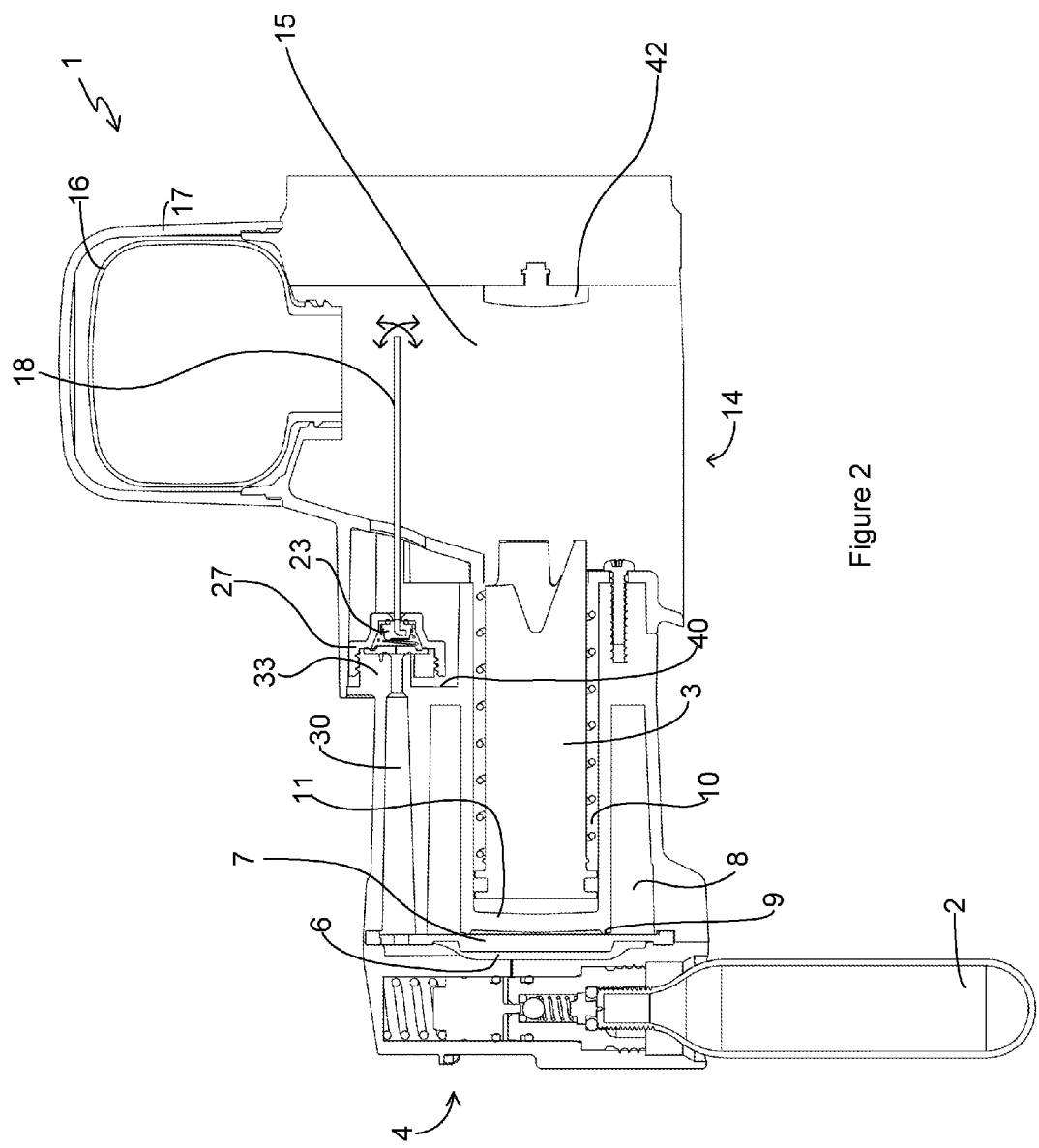
FIG. 2 is a cross-section through the trap of FIG. 1.
Figure 3:
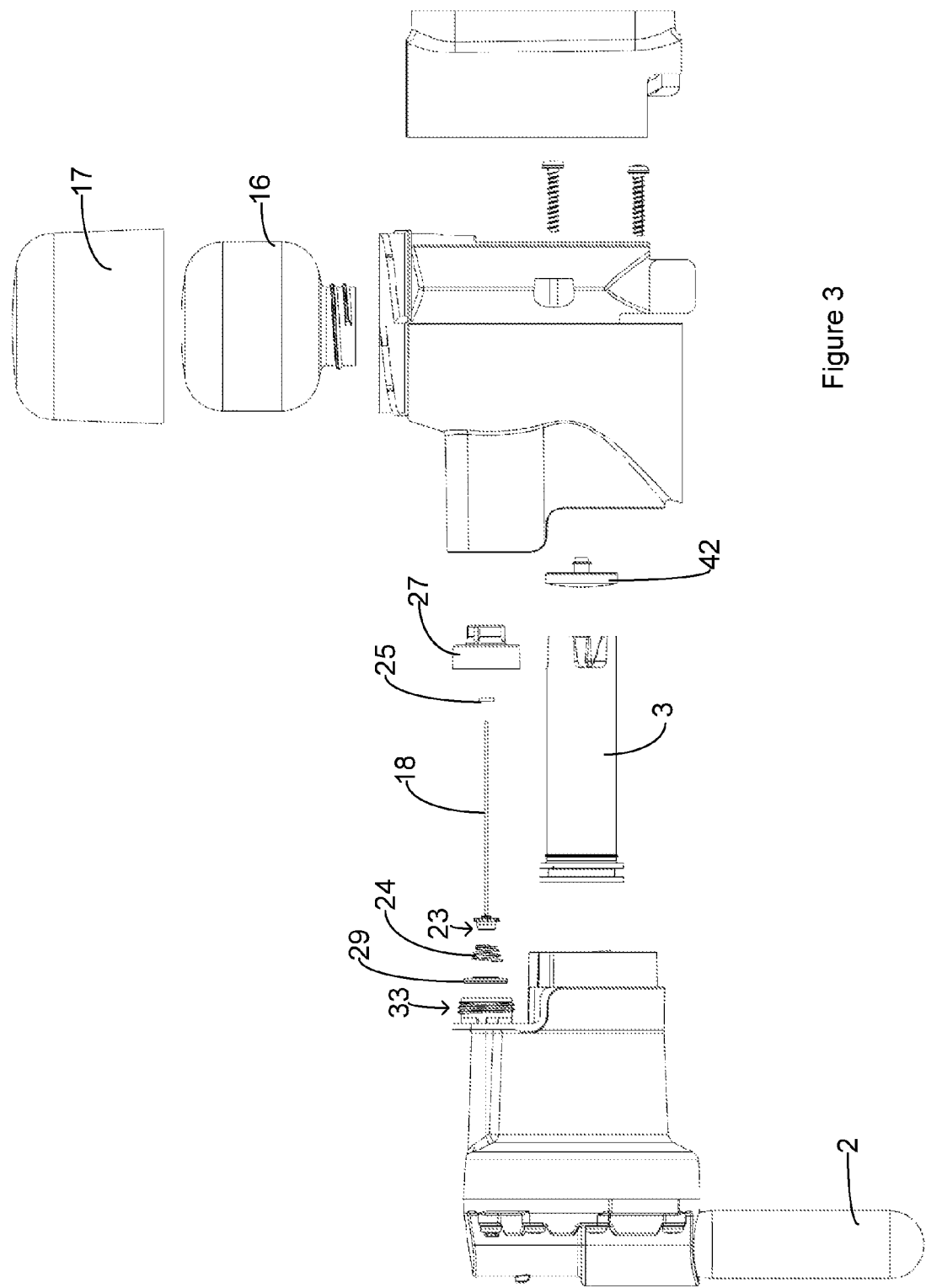
FIG. 3 is an exploded view of the trap of FIG. 1.
Figure 4:
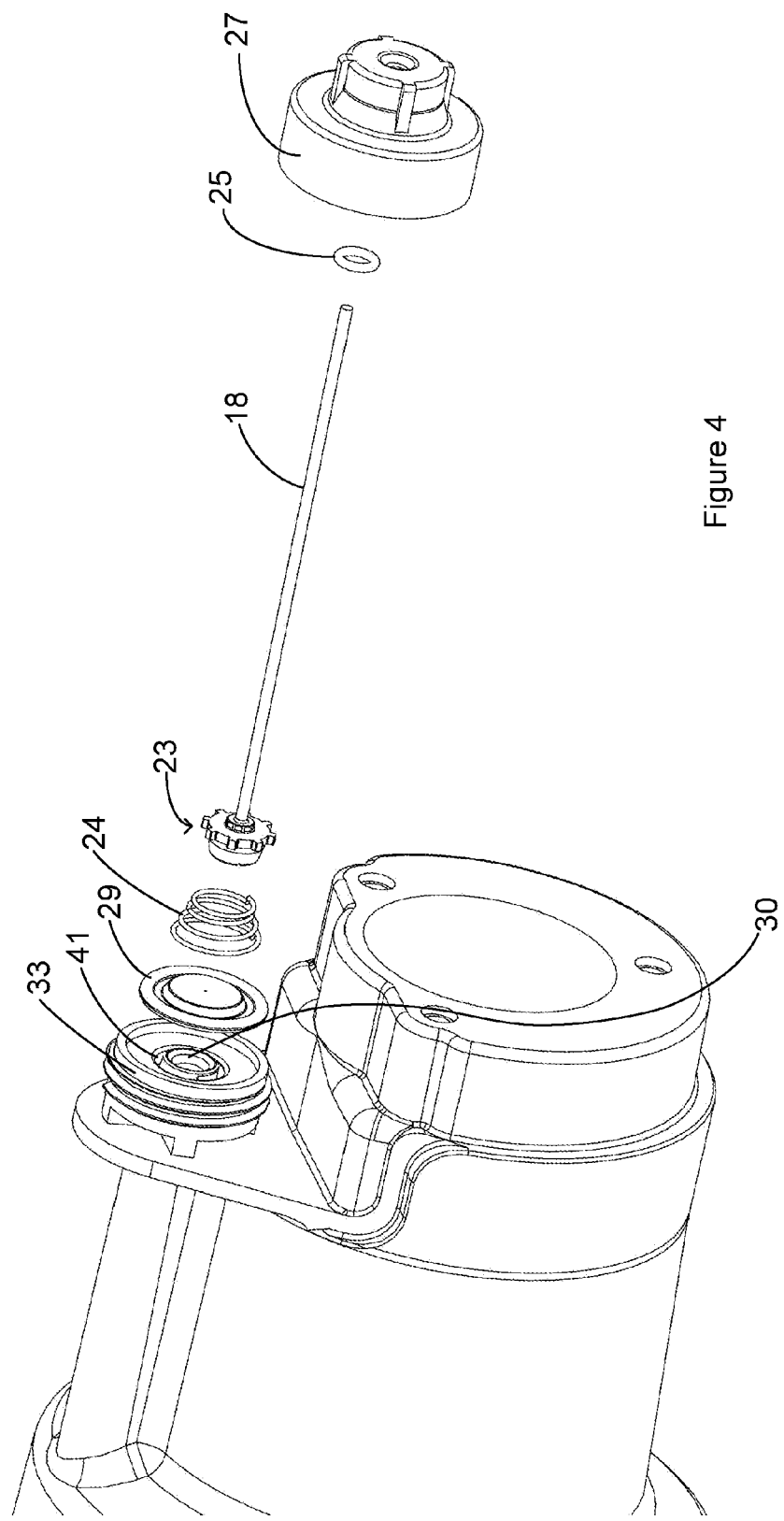
FIG. 4 is an exploded view of a trigger arrangement in the trap of FIG. 1.

FIG. 1 is a side view, FIG. 2 is a cross-section and FIG. 3 is an exploded view of a trap 1 according to one embodiment. The trap 1 includes a source of compressed gas 2, in the embodiment shown as a canister. The trap 1 also includes a flow control arrangement (described in detail below) designed to control gas flow for operation of a kill mechanism 3 by compressed gas drawn from source 2. However, other power sources may be used in some embodiments, such as sources of electricity or mechanical power.

The source 2 of compressed gas may be a canister (such as a readily available $CO_2$ canister), cylinder or any form of suitable reservoir for holding pressurised gas. The gas may be stored in a solid form within the source, being released from the source as a gas (as is the case with some $CO_2$ canisters). Such canisters are easily replaced when empty or as part of a routine servicing of the trap. Other sources of compressed gas can be re-pressurised. For example, some reservoirs could be re-pressurised using a bicycle pump or suitable electric pump. The use of compressed gas therefore provides a cheap, low-maintenance, reliable and versatile power source for the trap. Other suitable compressed gas sources may occur to the skilled reader. The compressed gas is preferably cheap and readily available, for example compressed carbon dioxide or air.

In the embodiment shown, the source 2 of compressed gas is connected to a regulator assembly 4. The regulator assembly is described in detail in PCT/NZ2010/000037 and PCT/NZ2011/000178, the entire contents of which are hereby incorporated by reference herein. The regulator will therefore not be discussed in detail in this specification. In FIG. 3 the regulator assembly 4 has not been exploded, but full details can be found in PCT/NZ2010/000037 and PCT/NZ2011/000178.

The regulator assembly allows the pressure provided by the source 2 to be controlled. In one embodiment the regulator assembly 4 reduces the pressure of a $CO_2$ gas source at around 200 to 3000 psi to an operating pressure of around 100 psi, or more preferably around 60 to 70 psi.

Gas flows from the source 2, through the regulator assembly 4 and then through a restricted flow path at a low rate to a main valve space 6 between the regulator assembly 4 and a main valve 7. In the embodiment shown the main valve 7 is in the form of a diaphragm. Gas flows through a further flow path through or beyond the main diaphragm 7 into an intermediate reservoir 8, which may be formed as an annular chamber. Pressure acting on the main diaphragm 7 forces the diaphragm against the end of the intermediate reservoir 8, forming a closed volume from which gas cannot escape until the trap is triggered.

The flow of gas described above, the main diaphragm, intermediate reservoir, baiting arrangements etc are all described in detail in PCT/NZ2010/000037 and PCT/NZ2011/000178, and need not be discussed in detail here. In some embodiments of the present invention alternative flow arrangements may be used.

A trigger arrangement acts to vent the space 6 behind the main diaphragm 7. This allows the gas pressure in the intermediate reservoir 8 to force the main diaphragm 7 away from the end perimeter 9 of the inner cylinder 10 in which the kill mechanism 3 rides. This allows gas to rush from the intermediate reservoir 8 around the end perimeter 9, through the bridge 11 and into the inner cylinder 10 to force the kill mechanism 3 suddenly and forcefully to the right.

In some embodiments the invention relates to a new trigger mechanism adapted to vent the space 6 in a very fast and efficient manner. The trigger mechanism may also be extremely sensitive, such that only a small force or movement is required to trigger the trap. This in turn means that the trigger mechanism can be used to trap a wide variety of pests, including very small pests incapable of applying a significant force to the trigger. Further, the trigger mechanism is expected to be suitable for many different species of pests, including pests that have been difficult to trap in the past.

As shown in FIG. 2, the trap 1 includes an entrance 14 into a chamber or space 15. Above the chamber or space 15 is a bait 16. In the embodiment shown the bait 16 is a long life baiting arrangement as described in PCT/NZ2011/000178.

The trap may include a bait mount 16' for attachment of the bait 16. A cover 17 may be arranged over the bait container. Alternatively, any other kind of bait may be used, including traditional paste baits such as peanut butter. Preferably a bait is chosen for the specific species of pest to be trapped. In preferred embodiments the bait is mounted separately from the trigger mechanism. This means that the weight of the bait does not act on the trigger, allowing a sensitive trigger to be used.

In use, an animal enters the trap through the entrance 14 and moves upwards in an attempt to access the bait 16. For large animals only part of the animal may enter the trap. Smaller animals may entirely enter the trap. As the animal moves upwards it will contact the trigger rod 18 which extends into the chamber or space 15 between the entrance 14 and the bait 16. The space or chamber 15 is preferably dimensioned such that an adult animal of the target species cannot move past the trigger rod 18 without actuating the trigger mechanism. Movement of the trigger rod 18 triggers the trap, as will be discussed in detail below. This results in sudden and forceful movement of the kill mechanism 3 into the chamber or space 15, killing the animal.

The Applicant has found that the time required from the trigger being actuated to the kill mechanism being fully extended is important to the efficacy of the trap. Pests entering the trap tend to be cautious and will react quickly to any noise or movement. Triggering of the trap creates noise through venting of gas (e.g. a hissing noise) or movement of parts. If the kill mechanism is not actuated quickly enough these noises or movements cause the pest to flee the trap and evade the kill mechanism. The reaction time of many pests is extremely fast. In preferred embodiments the time from actuation of the trigger to full extension of the kill mechanism is less than 30 ms, preferably less than 10 ms.

In the embodiment of FIGS. 1 to 7 an arrangement of valves is used to effect extremely fast full extension of the kill mechanism. This arrangement will now be described in more detail with reference to FIGS. 2 to 7.

Figure 5:
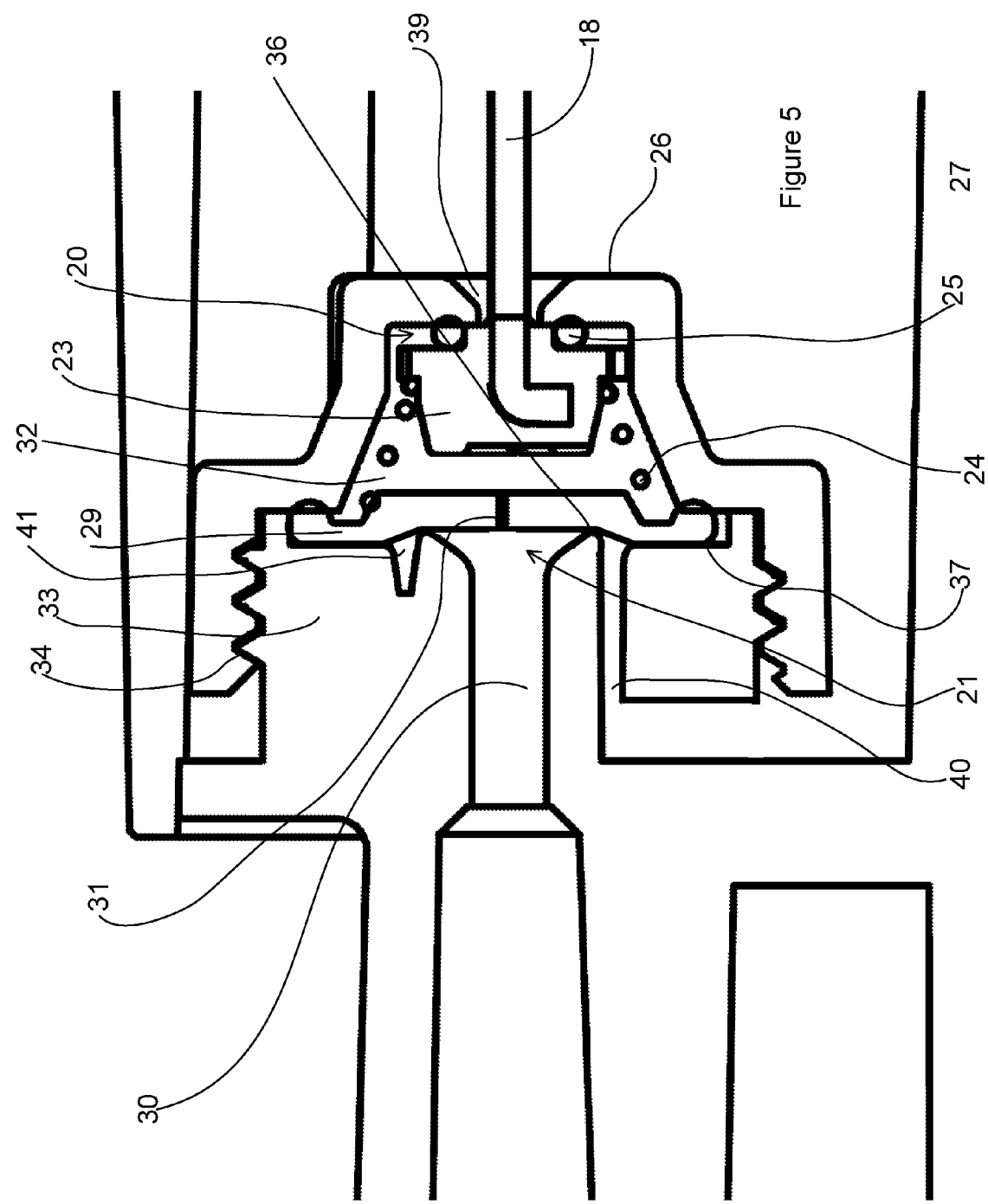
FIG. 5 is a more detailed cross-section through part of the trigger arrangement in the trap of FIG. 1.

In the embodiment shown, the trigger rod 18 is connected to a first trigger valve 20 (FIG. 5). Actuation of the first valve 20 in turn causes a second trigger valve 21 to open, and this second valve 21 is connected to the main valve space 6, such that the back of the main valve diaphragm 7 is vented. This causes movement of the main diaphragm and allows gas to flow from the intermediate reservoir 8 to the kill mechanism 3.

The trigger rod 18 is mounted to a valve member in the form of rod base 23. The rod base 23 is biased by a spring 24, which sits against the back surface of the rod base and presses the rod base to the right (as shown in the drawings). In preferred embodiments the restoring force provided by the spring 24 may be around 1-2 Newtons, ideally around 1.5 Newtons, although this depends on the weight and length of the trigger rod 18. The above ranges are suited to the trigger rod dimensions disclosed in this specification. In some embodiments the restoring force may be provided by other means. For example, if the trap is mounted with the trigger rod 18 hanging vertically, the restoring force may be provided by gravity acting on the trigger rod. Mass may be added to the rod or rod base as needed to provide the required force.

An O-ring 25 is mounted on the front of the rod base and creates a seal between the rod base 23 and a valve seat 26 provided by an inner surface of valve housing 27. The first valve 20 is therefore provided by the rod base 23, O-ring 25 and valve seat 26. In other embodiments the O-ring 25 may be mounted on the valve seat rather than the valve member. When open, gas is free to flow through the opening in the housing 27 through which the trigger rod 18 passes.

The second trigger valve 21 includes a second diaphragm 29 which closes the end of a flow path 30 that communicates with the main valve space 6 at the back of the main diaphragm 7. The second diaphragm may be formed from a suitable rubber material, such as Santoprene, with a Shore A hardness around 60-80, preferably around 68. A small bleed-hole 31 allows a low level gas flow between the flow path 30 and the first trigger valve space 32 between the first and second trigger valves. The bleed-hole 31 may be between 0.1 and 0.4 mm in diameter, preferably around 0.25 mm in diameter.

The flow path 30 may be provided in a valve base 33, to which the valve housing 27 attaches, for example by cooperating threads 34, thereby mounting the assembly of first and second valves and trigger rod to the trap body.

The operation of the trap and trigger mechanism will now be described.

When a gas source is first connected to the trap, or when the trap is resetting after killing an animal, compressed gas from the source 2 flows through the regulator assembly 4, arriving at the space 6 between the regulator assembly 4 and main diaphragm 7. Gas is allowed to flow through or beyond the main diaphragm 7 through a groove or bleed-hole, as described in PCT/NZ2010/000037 and PCT/NZ2011/000178, in order to fill the intermediate reservoir 8.

Gas also flows from the space 6 along flow path 30 to the back of the second diaphragm 29. While this pressure acts against the diaphragm, it is not sufficient to cause movement of the second diaphragm 29 to an open position. Gas therefore flows through the bleed-hole 31 into the first trigger valve space 32 between the first and second trigger valves. As pressure rises on both sides of the second diaphragm, pressure in the space 32 acts against a larger surface area of the diaphragm 29 than pressure in the flow path 30, thereby maintaining the second diaphragm in the closed position shown in FIG. 5 as the pressure rises. Further, the valve seat 36 formed at the end of the flow path 30 may extend slightly further than the shoulder 37 against which the second diaphragm 29 is mounted. This applies a slight offset to the diaphragm, helping to maintain it in the closed position.

After a short time, the intermediate reservoir 8, main valve space 6, flow path 30 and first trigger valve space 32 will all hold gas at substantially the same pressure. The trap is now ready to operate.

When an animal moves the trigger rod 18, the rod causes the rod base 23 to pivot against the inner surface of the valve housing 27. The exact location of the pivot point will depend on the direction in which the trigger rod moves, but in general will lie at a contact point between the rod base 23 and inner surface of the housing 27. In the embodiment shown pivoting movement of the trigger rod 18 in any direction will trigger the trap. That is, the trigger rod is mounted for pivoting movement with two degrees of rotational freedom.

In some embodiments pivoting movement of the trigger rod 18 and rod base 23 is allowed up to a threshold without triggering the trap. For example, pivoting movement of around 4 to 6 degrees away from the rest position may be allowed. This pivoting movement results in a release of pressure against the O-ring 25 on one side (generally the side towards which the trigger rod 18 is pushed). When movement exceeds the threshold, a space will open between the O-ring 25 and the valve seat 26, allowing gas to flow from the space 32 through the opening 39 to the atmosphere.

This venting of gas from the first trigger valve space 32 causes a sudden drop of pressure acting against the second diaphragm 29 in the space 32. The pressure in the flow path 30 therefore causes the diaphragm to move to the right and this allows gas to flow from the flow path 30 around the second trigger valve seat 36 and into a further flow path 40, which vents to the atmosphere. As shown, the further flow path 40 may communicate with an annular recess 41 surrounding the valve seat 36, to ensure efficient flow of gas from the flow path 30 into the further flow path 40.

This venting of gas from the flow path 30 causes a sudden venting of the main valve space 6. Due to this sudden drop in pressure in the main valve space 6, the pressure in the intermediate reservoir 8 is now sufficient to force the main diaphragm 7 to the left (as shown in the drawings) which allows gas to flow from the intermediate reservoir 8 around the end perimeter 9 of the inner cylinder, through the bridge 11 and into the central cylinder 10, where it acts on the kill mechanism 3 suddenly and forcefully moving it to the right (as shown) to strike the animal that moved the trigger rod 18.

The kill mechanism may act against a strike plate 42. This is a rubber buffer that helps to protect the trap body in the event that the trap is triggered when no animal is present (either accidentally or for testing purposes).

Figure 6:
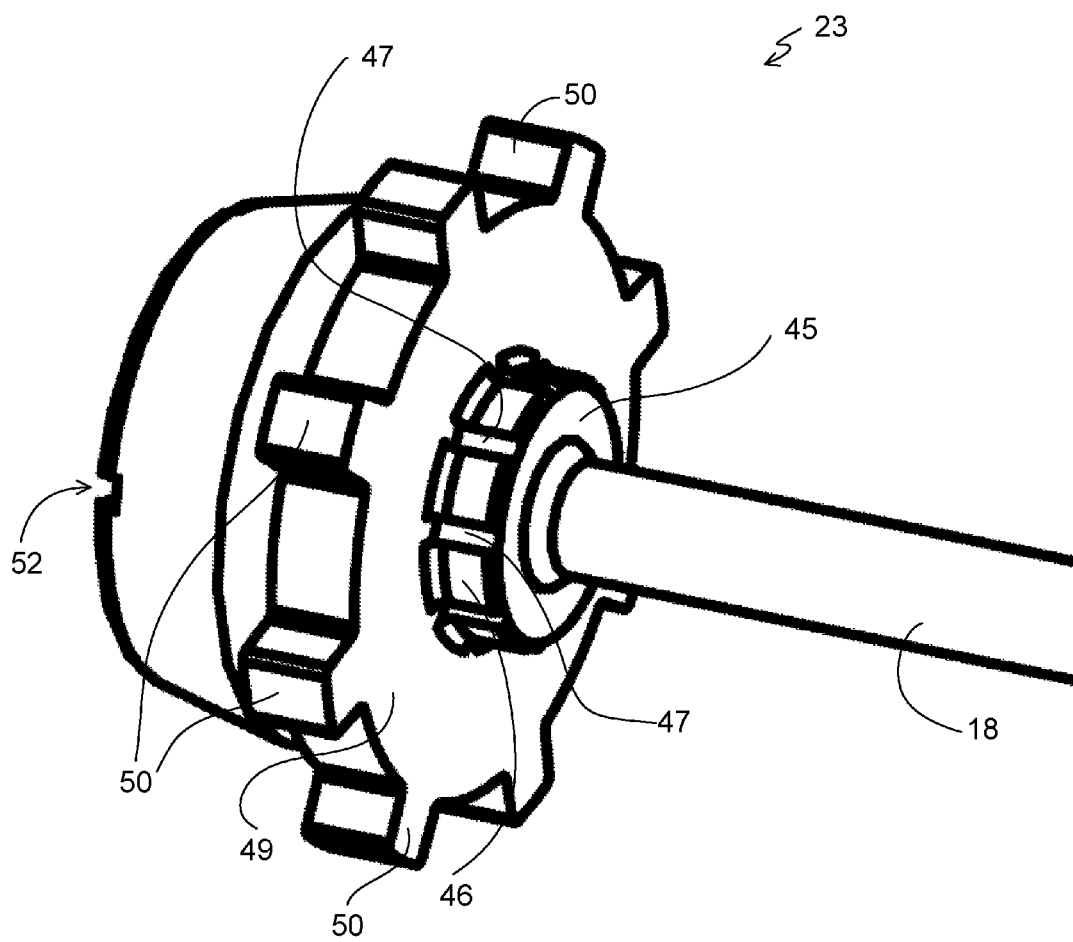
FIG. 6 shows the valve member of the trigger arrangement of the trap of FIG. 1 in more detail.

FIG. 6 is an enlarged view of the valve member or rod base 23. The valve member 23 has an O-ring retainer 45 in the form of a boss or protrusion. The protrusion 45 may be substantially cylindrical as shown. The O-ring 25 is received on the protrusion 45 such that its internal periphery sits against the surface 46 of the protrusion 45.

The surface 46 includes a number of flow paths 47, formed as channels or flutes. In other embodiments these flow paths 47 may be any suitable channels, conduits, recesses, grooves, apertures or flutes that provide the following function. The flow paths 47 allow gas to flow to and/or pressure to act on the internal periphery of the O-ring 25. If the surface 46 were formed as a plain cylindrical surface, this would not be possible.

The flow paths 47 provide a substantial improvement in valve performance. It is believed that the flow paths allow gas flow or pressure to act on the O-ring that stops the O-ring from being forced into the gap between the valve seat and valve member as the valve is opened. In other words, it causes the O-ring to remain positioned on the O-ring retainer. Where the O-ring is formed from a soft material, there is also be a tendency for the O-ring to move or flatten away from the opening as the valve is opened, or at least to settle onto the O-ring retainer. This dynamic O-ring mechanism helps to create a sudden release of pressure and to prevent extrusion of the O-ring into the gap between the valve seat and valve member.

The above advantages of the flow paths 47 may be due to flow of gas into the flow paths or simply due to the ability for gas pressure to access the internal periphery of the O-ring.

The O-ring is preferably formed from a relatively soft material, such as nitrile or silicone rubber, with silicone rubber being preferred. The O-ring material may have a Shore A hardness value of around 55 to 70, preferably around 60. The hardness value is measured according to ASTM D2240 type A scale, as at 1 Aug. 2012. These materials allow the above movement or deformation of the O-ring when the first trigger valve opens.

The O-ring may have an internal diameter less than 10 mm, preferably between 2 and 5 mm, ideally around 3 mm.

The O-ring may have a radial cross-section that is less than 3 mm in width, preferably between 0.5 and 2 mm in width, ideally around 1 mm in width.

Figure 7:
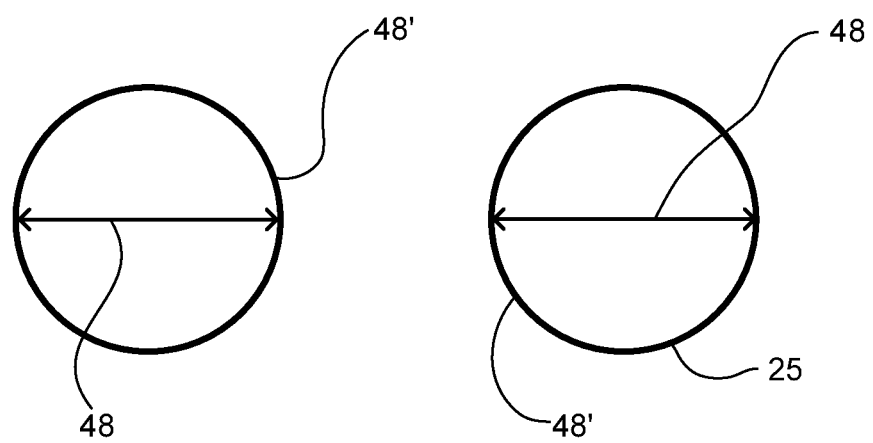
FIG. 7 is a cross-section through an O-ring of the trigger arrangement.

FIG. 7 shows a cross-section through the O-ring 25, with the radial cross-section width 48 and inner periphery 48' marked. The two circles are the two sides of the O-ring 25.

The valve member 23 has a sealing surface 49 on which the bottom of the O-ring rests in the assembled valve.

In the embodiment shown the valve member 23 has a periphery formed in an undulating manner, or with a number of protrusions 50. These protrusions 50 help to centre the valve member 23 in the valve housing 27, while allowing gas to flow past the valve member 23.

The valve member 23 also includes a number of recesses 52 formed in its rear surface. These help to prevent the diaphragm 29 of the second trigger valve from sealing against the valve member 23. This would prevent the trigger valves from resetting correctly.

As shown in FIG. 5, the trigger valve space 32 between the first and second trigger valves has a small volume. The gas volume of this space 32 may be less than 2 cm$^3$, preferably less than 1 cm$^3$, more preferably around 0.1 to 0.5 cm$^3$, ideally around 0.2 to 0.3 cm$^3$. In the embodiment shown the gas volume of space 32 may be around 0.25 cm$^3$.

The trigger arrangement described above has several important advantages over prior traps.

The trigger rod 18 is formed from thin material, such as a metal (preferably stainless steel) or other suitable material. It therefore has a low mass. In one embodiment the trigger rod may weigh less than 5 grams (0.18 ounces), preferably less than 3 grams. The trigger rod may weigh between 0.5 and 1 gram (0.018 to 0.035 ounces), ideally about 0.6 grams (about 0.02 ounces). This low weight means that it exerts a minimal force on the rod base and the spring 24 need exert only a low force to maintain the first valve 20 in a closed position. In one embodiment the spring may exert a force around 150 grams (about 1.5 Newtons). This in turn means that the pressure required to move the trigger rod in order to open the first valve is low, meaning that the trigger mechanism is extremely sensitive. In one embodiment the trap may be triggered by a force as low as 20-25 grams (around 0.2-0.25 Newtons). The trap can therefore be used to kill extremely small or cautious pests that do not exert a significant force.

The small volume of the space between the first and second valves means that the space can be very quickly vented. This results in fast actuation of the second trigger valve and so on until the main valve is actuated, allowing gas to rush to the kill mechanism.

In the embodiment shown there are two trigger valves. However, in some embodiments a larger number of trigger valves connected in series may be used. The trigger valves are actuated in a cascading manner as the trigger valve spaces are vented, until the last trigger valve opens and vents the main valve space.

Figure 8:
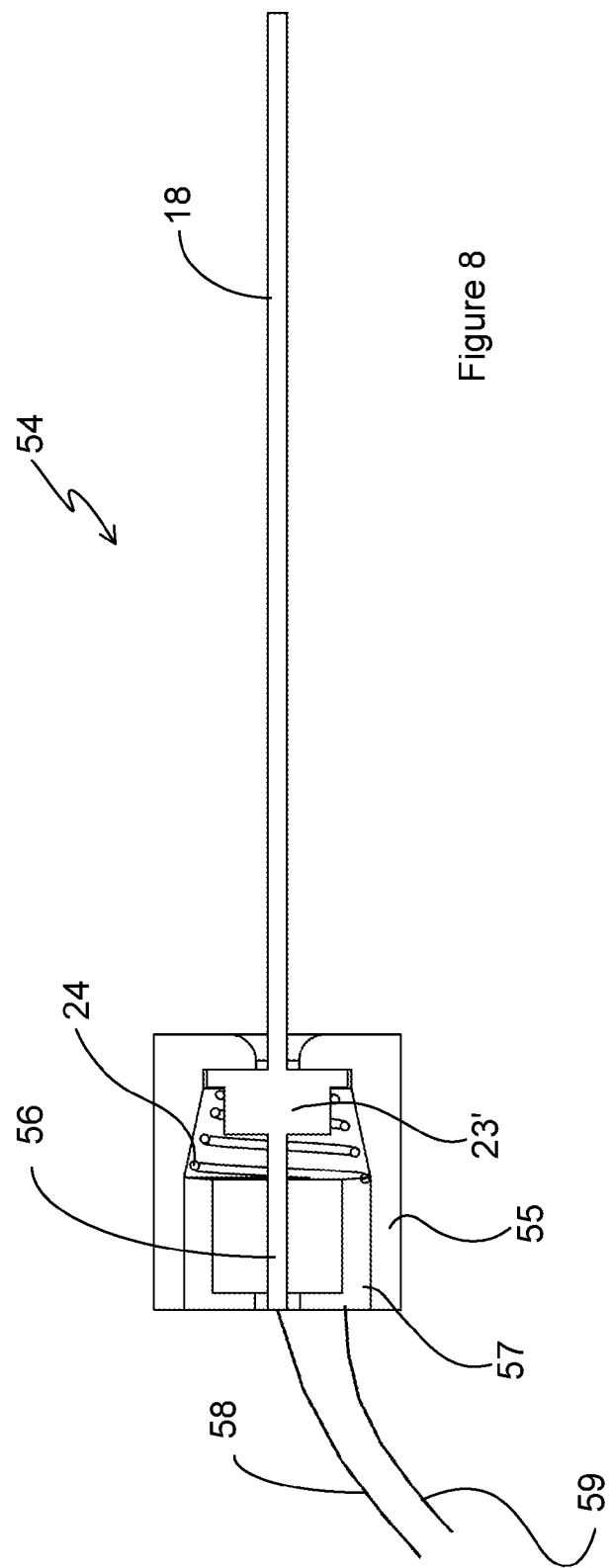
FIG. 8 shows a trigger mechanism according to a further embodiment.

FIG. 8 shows a further embodiment of trigger mechanism 54 suitable for an electrically powered trap. In this embodiment a trigger rod 18 is mounted to a rod base 23' mounted in a housing 55. The rod base 23' is biased by a spring 24 as in the embodiment described above. However, in this embodiment a switch contact 56 is mounted to a rear side of the rod base 23'. A further contact is formed by conductive insert 57 mounted to the housing 55. The trigger rod again moves with two degrees of rotational motion and has a threshold, below which triggering will not occur. When the trigger rod 18 is moved beyond the threshold, the contact 56 will contact the conductive insert 57. This allows current to flow in a circuit connected by wires 58, 59 to the trigger switch. This in turn causes actuation of the kill mechanism.

Figure 9:
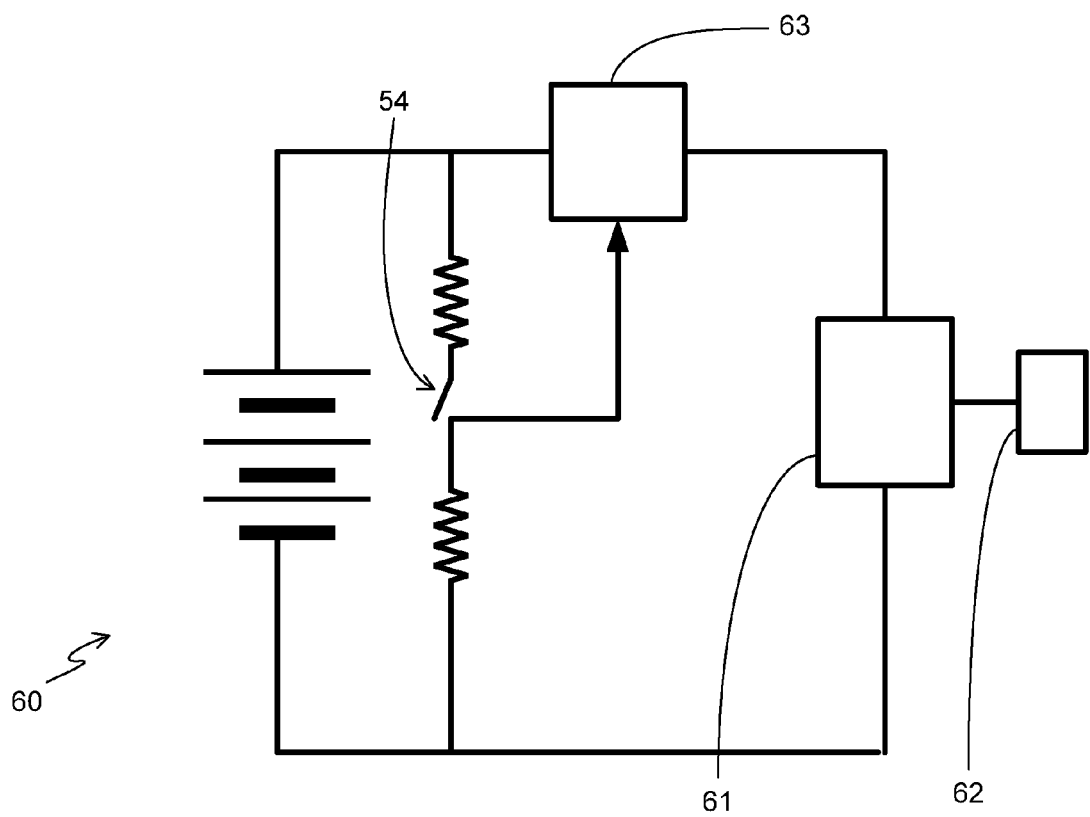
FIG. 9 is a circuit diagram for a further embodiment, being an electronic trap including the trigger mechanism of FIG. 8.

FIG. 9 shows an electrically powered trap circuit in which a power source 60 is configured to provide power to an actuator 61 connected to a kill mechanism 62. Supply of power may be controlled by a controllable switch 63 (e.g. a FET or similar). The controllable switch 63 is controlled by the trigger switch 54 of FIG. 7, which when closed results in a voltage being applied to the FET control and flow of power to the actuator 61.

In any of the above embodiments, the trigger rod is preferably formed from a stiff material, such as stainless steel. The trigger rod may have a diameter less than 5 mm, preferably less than 3 mm, more preferably between 1 and 2 mm. The trigger rod may extend between 30 and 70 mm from the mount, preferably between 40 and 60 mm from the mount.

The length of the trigger rod has an impact on the threshold and stroke required, as well as the force that must be exerted. For a given angular threshold of 4-6 degrees, a shorter trigger rod must be moved through a shorter stroke to actuate the trap. However, a shorter trigger rod requires a greater force to be exerted, because it is a shorter lever than a longer trigger rod.

The trigger rod preferably extends transverse to a direction in which an animal must move in an attempt to access the bait. In preferred embodiments the trigger rod extends into a space between a bait and an entrance to the trap, while the kill mechanism operates between the trigger rod and the entrance.

The spring 24 may exert a restoring force of around 1.5 Newtons.

The Applicant's trap is capable of adaptation for many different pests or groups of pests, including but not limited to: mice, rats, stoats, possums, ferrets, birds, mongoose, muskrat, mink, beaver, nutria, squirrel, snakes, monitor lizards, cats, foxes, dogs, hedgehogs, weasels and ungulets. Clearly, the nature of the pests will depend on the country where the trap is used. The Applicant's trap can target any desired animal through its installation (e.g. height above ground), size of the opening in the housing, and the use of a particular bait. The improved trigger mechanism is capable of actuation by a variety of pests, including very small pests capable of applying only a small force.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:
1. A pneumatically powered animal trap including:
  I. a trap body including a chamber;
  II. a source of compressed gas;
  III. a trigger mechanism configured to be actuated by an animal, the trigger mechanism including:
    two or more trigger valves connected in series, the two or more trigger valves including a first trigger valve and a last trigger valve;

one or more trigger valve spaces, each of the trigger valve spaces being positioned between two of the two or more trigger valves; and a trigger being positioned within the chamber, the trigger configured to open the first trigger valve when actuated by an animal within the chamber;

IV. a main valve;

V. a main valve space between the last trigger valve and the main valve; and

VI. a kill mechanism powered by the compressed gas;

wherein the trigger valves, trigger valve spaces, main valve and main valve space are arranged such that, in use:

a) in a ready state, each of the trigger valve spaces and the main valve space are pressurized by the compressed gas;

b) opening of each of the trigger valves vents one of the trigger valve spaces, which in turn causes a further one of the trigger valves to open until all of the trigger valves have been opened; and c) opening of the last trigger valve vents the main valve space, which causes actuation of the main valve to allow the compressed gas to flow to the kill mechanism for killing the animal within the chamber.

2. A trap as claimed in claim 1 wherein the first trigger valve is configured to vent a first one of the trigger valve spaces having a volume less than 2 cm$^3$.

3. A trap as claimed in claim 2 wherein the first one of the trigger valve spaces has a volume less than 1 cm$^3$.

4. A trap as claimed in claim 3 wherein the first one of the trigger valve spaces has a volume between 0.1 and 0.5 cm$^3$.

5. A trap as claimed in claim 4 wherein the first one of the trigger valve spaces has a volume around 0.25 cm$^3$.

6. A trap as claimed in claim 1 wherein the first trigger valve includes:
   i. an opening;
   ii. a valve seat surrounding the opening;
   iii. a valve member having a sealing surface;
   iv. an O-ring arranged to seal between the sealing surface and the valve seat; and
   v. an O-ring retainer configured to retain the O-ring on either the valve member or the valve seat.

7. A trap as claimed in claim 6 wherein the first trigger valve further includes one or more flow paths allowing gas flow along at least part of an internal periphery of the O-ring.

8. A trap as claimed in claim 1 further including a bait or bait mount separate from the trigger.

9. A trap as claimed in claim 1 wherein the last trigger valve includes a diaphragm sealing an exit from the main valve space, wherein venting of a last trigger valve space of the trigger valve spaces releases pressure on one side of the diaphragm, thereby allowing the diaphragm to move to open the exit, thereby venting the main valve space.

10. A trap as claimed in claim 1 wherein the trigger valves include only the first trigger valve and the last trigger valve and the trigger valve spaces include only a single trigger valve space between the first and last trigger valves.

11. An animal trap as claimed in claim 1 wherein the trigger is a trigger rod extending in a rest position from a mount at or near a first end thereof, the trigger rod being mounted for pivoting movement about the mount with two rotational degrees of freedom, and arranged such that pivoting movement of the trigger rod in any direction away from the rest position results in actuation of the trigger.

12. A pneumatically powered animal trap including:

I. a trap body including a chamber;

II. a source of compressed gas;

III. a trigger mechanism configured to be actuated by an animal, the trigger mechanism including:

a) two or more trigger valves connected in series, the two or more trigger valves including a first trigger valve and a last trigger valve;

one or more trigger valve spaces, each of the trigger valve spaces being positioned between two of the two or more trigger valves, each of the trigger valve spaces is pressurized by the compressed gas; and wherein the first trigger valve includes:
   i. an opening;
   ii. a valve seat surrounding the opening;
   iii. a valve member having a sealing surface;
   iv. an O-ring arranged to seal between the sealing surface and the valve seat; and
   v. an O-ring retainer configured to retain the O-ring on either the valve member or the valve seat;
   vi. one or more flow paths allowing gas flow along at least part of an internal periphery of the O-ring; and b) a trigger being positioned within the chamber, the trigger configured to open the first trigger valve when actuated by an animal within the chamber, the trigger operating to pivot the valve member so as to break the seal between the sealing surface and the valve seat;

IV. a main valve;

V. a main valve space, said main valve space is pressurized by the compressed gas; and VI. a kill mechanism powered by the compressed gas;

wherein opening of each of the trigger valves vents one of the trigger valve spaces, which in turn causes a further one of the trigger valves to open until all of the trigger valves have been opened; and opening of the last trigger valve vents the main valve space, which causes actuation of the main valve to allow the compressed gas to flow to the kill mechanism for killing the animal within the chamber.

13. A trap as claimed in claim 12 wherein the one or more flow paths include one or more channels, conduits, recesses, grooves, apertures or flutes along or communicating with the internal periphery of the O-ring.

14. A trap as claimed in claim 12 wherein the one or more flow paths are formed on the O-ring retainer.

15. A trap as claimed in claim 12 wherein the O-ring is a dynamic O-ring that deforms and/or moves under pressure when the first trigger valve is opened.

16. A trap as claimed in claim 12 wherein the O-ring has an internal diameter less than 10 mm.

17. A trap as claimed in claim 12 wherein the O-ring has a radial cross-section that is less than 3 mm in width.

* * * * *